(12) United States Patent
Kawasaki et al.

(10) Patent No.: US 7,855,847 B2
(45) Date of Patent: Dec. 21, 2010

(54) OPTICAL COMPONENT AND IMAGE PICKUP UNIT

(75) Inventors: Toyotoshi Kawasaki, Kawachinagano (JP); Hisanori Itou, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

(21) Appl. No.: 12/397,949

(22) Filed: Mar. 4, 2009

(65) Prior Publication Data
US 2009/0225455 A1  Sep. 10, 2009

(30) Foreign Application Priority Data
Mar. 7, 2008 (JP) .............................. 2008-057693

(51) Int. Cl.
*G02B 7/02* (2006.01)
(52) U.S. Cl. ...................... 359/830; 359/819
(58) Field of Classification Search ................. 359/830, 359/819, 649, 651
See application file for complete search history.

(56) References Cited

U.S. PATENT DOCUMENTS 6,310,735 B1 * 10/2001 Best et al. .................... 359/819
2008/0024883 A1 * 1/2008 Iwasaki ...................... 359/819

FOREIGN PATENT DOCUMENTS

JP  2002-90603   3/2002
JP  2008-216706  9/2008

* cited by examiner

*Primary Examiner*—Alicia M Harrington
(74) *Attorney, Agent, or Firm*—Finnegan, Henderson, Farabow, Garrett & Dunner, L.L.P.

(57) ABSTRACT

An optical component includes: an optical element; a sealing member in a ring shape arranged on the optical element; a stepped portion formed on a front of a circumference surface of the optical element; and a movement-restricting portion arranged at a rear of the optical element. The stepped portion restricts a movement of the sealing member toward a front of the optical element, and the movement-restricting portion restricts a movement of the sealing member toward a rear of the optical element.

9 Claims, 5 Drawing Sheets

OPTICAL COMPONENT AND IMAGE PICKUP UNIT

This application is based on Japanese Patent Application No. 2008-057693 filed on Mar. 7, 2008, in Japanese Patent Office, the entire content of which is hereby incorporated by reference.

TECHNICAL FIELD

The present invention relates to an optical component and to an image pickup unit.

BACKGROUND

In recent years, there is used a waterproof camera having the structure that stands up to use in surroundings where the camera is exposed to wind and rain as well as the open air is used as a car-mounted camera and an outdoor type camera.

In the waterproof camera of that kind, there is known a technology to incorporate a lens representing an optical element in a case body through a rubber gasket such as an O-ring, for providing a waterproof function that prevents a drop of water from leaking into the camera.

For example, FIG. 2 and FIGS. 4-7 in Unexamined Japanese Patent Application Publication (JP-A) No. 2002-90603 disclose a technology to incorporate a lens in a case body with an O-ring arranged on the rear side of the lens. In this case, the O-ring is compressed in the optical axis direction because the lens is pushed into the case body from the front side of the case body to be mounted. An arrangement of the lens is sometimes shifted in the optical axis direction, because repulsive power of the O-ring pushes back the lens in the optical axis direction.

If the lens position in the camera is shifted in the optical axis direction, it causes a trouble that an image of a photographic subject cannot be formed properly on an image pickup device such as CCD. In particular, if the lens is shifted in the optical axis direction in a wide-angle lens, this causes a critical problem.

FIG. 3 in JP-A No. 2002-90603 also discloses a technology that a stepped portion is formed on the circumference surface of the lens and an O-ring is arranged on the stepped portion. By incorporating the lens into the case body with the O-ring pressed in a direction perpendicular to an optical axis of the lens, the shift of the lens in the optical axis direction, which is cause due to the above arrangement of the O-ring, can be solved. As for optical systems composed of a wide-angle lens group such as a car-mounted camera and a monitoring camera, most of the optical systems employ a negative lens or meniscus lens with a convex surface facing the object side as a front lens which is positioned at the forefront closest to the object side of the optical system. Particularly in the optical systems, it is easy to make a stepped portion where an O-ring is arranged on a circumference surface of the lens without enlarging the lens.

However, as downsizing of an image pickup unit is advanced in recent years, it becomes difficult to secure a large stepped portion where rubber gasket 60 is arranged on the circumference surface of the lens as shown in FIG. 5. Thus, arranging rubber gasket 60 properly on the stepped portion requires a technique. Further, if the arranged rubber gasket 60 is in the twisted condition, the rubber gasket 60 sometimes drops off its arrangement space at the time that distortion of the rubber gasket 60 is restored by its elastic force.

Further, when lens 10 is drawn out from case body 40 for the purpose of incorporating the lens 10 again, on the halfway of the work to incorporate lens 10 in the case body 40 by pushing the lens in, it is possible to cause the following problem. If the rubber gasket 60 is pushed and is in contact already with an inner circumference surface of case body 40, only lens 10 is drawn out from the case body 40 and the rubber gasket 60 stays on the case body 40. Thus, the rubber gasket 60 sometimes drops off the lens 10.

When the rubber gasket 60 drops off the lens 10, it is necessary to mount rubber gasket 60 on the outer circumference surface of the lens 10 again, which results in occurrence of a problem that its incorporating work becomes complicated.

Further, the stepped portion is arranged on the rear side surface of the lens, and includes a surface perpendicular to the optical axis and a surface parallel to the optical axis. Therefore, harmful light to cause flare light tends to occur. When a wide-angle lens group employs this structure in particular, occurrence of harmful light becomes more remarkable, because harmful light further enters from an out of the angle of view easily.

SUMMARY

An object of the invention is to provide an optical component and an image pickup unit wherein optical elements can be incorporated more properly in an image pickup unit, and occurrence of unwanted light in a wide-angle optical system can be reduced.

An optical component relating to the invention is an optical component including: an optical element; a sealing member in a ring shape arranged on the optical element; a stepped portion formed on a front of a circumference surface of the optical element by changing an outer diameter of the optical element; and a movement-restricting portion arranged at a rear of the optical element. The stepped portion restricts a movement of the sealing member toward a front of the optical element, and the movement-restricting portion restricts a movement of the sealing member toward a rear of the optical element.

These and other objects, features and advantages according to the present invention will become more apparent upon reading of the following detailed description along with the accompanied drawings.

BRIEF DESCRIPTION OF DRAWINGS

Embodiments will now be described, by way of example only, with reference to the accompanying drawings which are meant to be exemplary, not limiting, and wherein like elements numbered alike in several Figures, in which.

Each of FIGS. 4(*a*)-4(*e*) is a sectional view showing a modification example of a movement regulating means in an image pickup unit (lens unit), and modification example 1, modification example 2, modification example 3, modification example 4 and modification example 5 are respectively shown.

DESCRIPTION OF EMBODIMENTS

Figure 1:
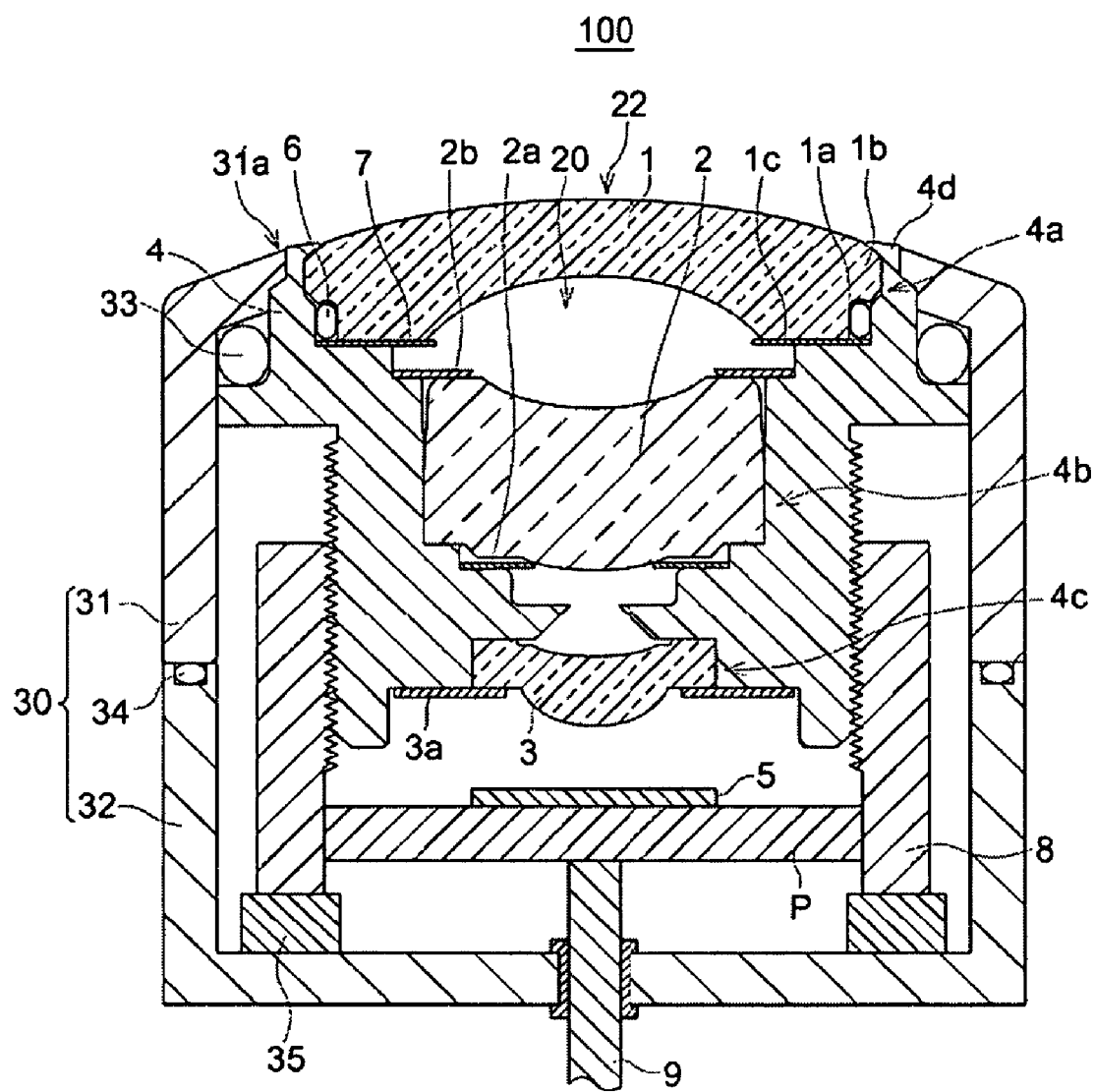
FIG. 1 is a sectional view showing an image pickup unit relating to the invention.

Preferred embodiments of the present invention will be described below.

A preferred embodiment of the present invention is an optical component comprising: an optical element; and a sealing member in a ring shape arranged on the optical element. The optical component further comprises a stepped portion formed on a front of a circumference surface of the optical element by changing an outer diameter of the optical element. The stepped portion restricts a movement of the sealing member toward a front of the optical element. The optical component further comprises a movement-restricting portion arranged at a rear of the optical element. The movement-restricting portion restricts a movement of the sealing member toward a rear of the optical element.

In the embodiment, the optical element may be a negative lens or a meniscus lens with a convex surface facing an object side of the optical element.

In the embodiment, it is preferable that the optical element is a lens arranged at a forefront in a wide-angle lens group.

In the embodiment, it is preferable that the movement-restricting portion is formed on at least one of the optical element and the sealing member.

In the embodiment, the movement-restricting portion may comprise a plate member on the optical element. The plate member is attached to a rear surface of the optical element so as to restrict the movement of the sealing member toward the rear of the optical element, where the rear surface is substantially perpendicular to an optical axis of the optical element.

In the above embodiment, the plate member is preferably an incident-light limiting member.

In the embodiment, the movement-restricting portion may comprise a portion formed on the optical element as one body with the optical element so as to restrict a movement of the sealing member toward the rear of the optical element.

In the embodiment, the movement-restricting portion may comprises a second stepped portion on the optical element, where the second stepped portion is formed by changing the outer diameter of the optical element.

In the embodiment, the second stepped portion may be formed on a rear of the circumference surface of the optical element, and the movement-restricting portion may further comprise a fit portion on the sealing member fitted to the second stepped portion.

Another preferred embodiment of the present invention is an image pickup unit comprising: a casing; and the above optical component arranged in the casing.

According to the embodiments, the sealing member hardly drops off the optical element, because the sealing member in a ring shape is positioned between the stepped portion of the optical element and by the movement-restricting portion in the optical component.

In other words, when incorporating an optical element in prescribed portion (for example, supporting member) in an image pickup unit and in a lens unit, a sealing member in a ring shape arranged on a circumference surface of an optical element is restricted by a movement-restricting mechanism so that the sealing member may not move in the optical axis direction of its optical element, thus, the optical element can be incorporated easily into the supporting member in a way for the sealing member not to drop off the optical element, whereby, optical elements can be incorporated more properly.

According to the above embodiments, optical elements can be incorporated into an image pickup unit more easily, and optical elements can be incorporated more properly into an image pickup unit.

Embodiments of the invention will be explained in detail in reference to the drawings.

As shown in FIG. 1, image pickup unit 100 is equipped with image pickup element 5 mounted on substrate P, a lens group that leads light of a photographic subject to the image pickup element 5 including first lens 1, second lens 2, and third lens 3, supporting member 4 that supports respective lenses at their prescribed positions, O-ring 6 representing a sealing member in a ring shape that is interposed between an outer circumferential surface of the first lens 1 representing an optical element and an inner circumferential surface of the supporting member 4. The O-ring 6 is compressed in the direction almost perpendicular to the optical axis of the optical element. The image pickup unit 100 is further equipped with light shielding plate 7 representing a movement-restricting portion provided on the bottom surface of the first lens 1 and outer frame member 30 representing a case body that covers the image pickup element 5 and the supporting member 4.

This image pickup unit 100 is provided for being mounted on various equipments. For example, image pickup unit can be mounted on cars as a car-mounted camera and can be mounted on monitoring devices as a security camera.

The image pickup element 5 is, for example, a CCD-type image sensor or a CMOS-type image sensor which is mounted on a top surface of substrate P.

Further, the substrate P is fixed on fixing member 8, and cable 9 is fixed on the substrate P to extended on the outer surface of the outer frame member 30, to be connected to prescribed equipment (such as cars, and monitoring devices).

Meanwhile, elastic member 35 is interposed between the fixing member 8 and the outer frame member 30 so that the substrate P and the image pickup element 5 may be supported stably by the outer frame member 30.

The supporting member 4 is, for example, a member that is made of denatured PA resin or PPA resin and is mostly in a shape of cylinder. The supporting member 4 includes upper mounting position 4a, intermediate mounting position 4b and lower mounting position 4c each being a position where an optical element is mounted, on the side of its inner circumferential surface.

A lens group constitutes a wide-angle lens group composed of first lens 1 positioned at the forefront which is closest to a photographic subject, third lens 3 positioned at a position closest to the image pickup element 5 and of second lens 2 positioned between the first lens 1 and the third lens 3. The first lens 1 is fixed on the upper mounting position 4a of the supporting member 4, the second lens 2 is fixed on the intermediate mounting position 4b of the supporting member 4 and the third lens 3 is fixed on the lower mounting position 4c of the supporting member 4.

Meanwhile, the first lens 1 is a negative lens or a meniscus lens including a convex surface facing the object (photographic subject), positioned at the forefront of the wide angle-lens group.

There is formed sealed surface portion 1a where O-ring 6 is arranged and stepped portion 1b on a circumference surface of the first lens 1, fully around the first lens 1. The stepped portion 1b is arranged at the front of the sealed surface portion 1a in the direction of the optical axis and has an outer diameter that is larger than that of the sealed surface portion 1a.

Namely, each of the sealed surface portion 1a and the stepped portion 1b is formed by changing the outer diameter of optical elements on the outer circumference surface of the first lens 1.

Further, the light shielding plate 7 is attached on bottom surface 1c of the first lens 1 in which O-ring 6 is arranged on the sealing surface portion 1a.

This first lens 1 is inserted to the upper mounting position 4a from the upper portion, to be fixed, so that the light shielding plate 7 may be interposed between the supporting member 4 and the first lens 1.

Incidentally, optical component 22 is composed of the first lens 1, O-ring 6 and of the light shielding plate 7.

The O-ring 6 is a sealing member in a ring shape that closely contact with an outer circumference surface of the first lens 1 and with an inner circumference surface of the supporting member 4 to seal a space between the first lens 1 and the supporting member 4.

The light shielding plate 7 is an incident-light limiting member that cuts unwanted light entering towards image pickup element 5, and is a plane that faces the supporting member 4 in the first lens 1, and it is a circular plate member mounted on bottom surface 1c representing a rear surface perpendicular to the optical axis.

Meanwhile, this plate member is not always necessary to be circular as far as it can prevent the O-ring from dropping off and it has an effect to cut unwanted light. The plate member can be in a form such that a part of the circumference of a circle is missing or a cross-like form.

The second lens 2 is inserted from the upper side to the intermediate mounting position 4b to be fixed, so that bottom surface diaphragm plate 2a may be interposed between the supporting member 4 and the second lens. The second lens 2 is arranged so that fixing plate 2b representing a top surface diaphragm plate may touch the top surface side of the second lens.

The third lens 3 is inserted from the lower side to the lower mounting position 4c to be fixed, and it is arranged so that supporting plate 3a may touch the bottom surface side of the third lens.

Meanwhile, the first lens 1, the second lens 2 and the third lens 3 are fixed on the supporting member 4, to constitute lens unit 20.

Then, an outer circumference surface on the lower side of supporting member 4 in lens unit 20 is screwed in fixing member 8, and it is possible to conduct positioning of the lens for image pickup element 5, by adjusting a distance from lens unit 20 to substrate P so that an extent of screwing between supporting member 4 and fixing member 8 may be adjusted.

Outer frame member 30 is composed of front case body 31 and rear case body 32. Lens unit 20 is arranged in a way that the first lens 1 may be exposed through the front apertural area 31a of the front case body 31, and then, the rear case body 32 is mounted on the front case body 31 from the substrate P side. Thereby, the lens unit 20 and the image pickup element 5 are housed in the outer frame member 30. Rubber gasket 33 is provided between the inner circumference surface of the front case body 31 and the outer circumference surface of the supporting member 4. Rubber gasket 34 is provided on the joining section between the front case body 31 and the rear case body 32. Both of rubber gaskets are in close contact with another members so that a gap may not be caused.

Optical component 22 (lens unit 20) is arranged in the outer frame member 30 to construct image pickup unit 100.

Next, a structure for incorporating the first lens 1 in the image pickup unit 100 (lens unit 20) will be explained.

Figure 2:
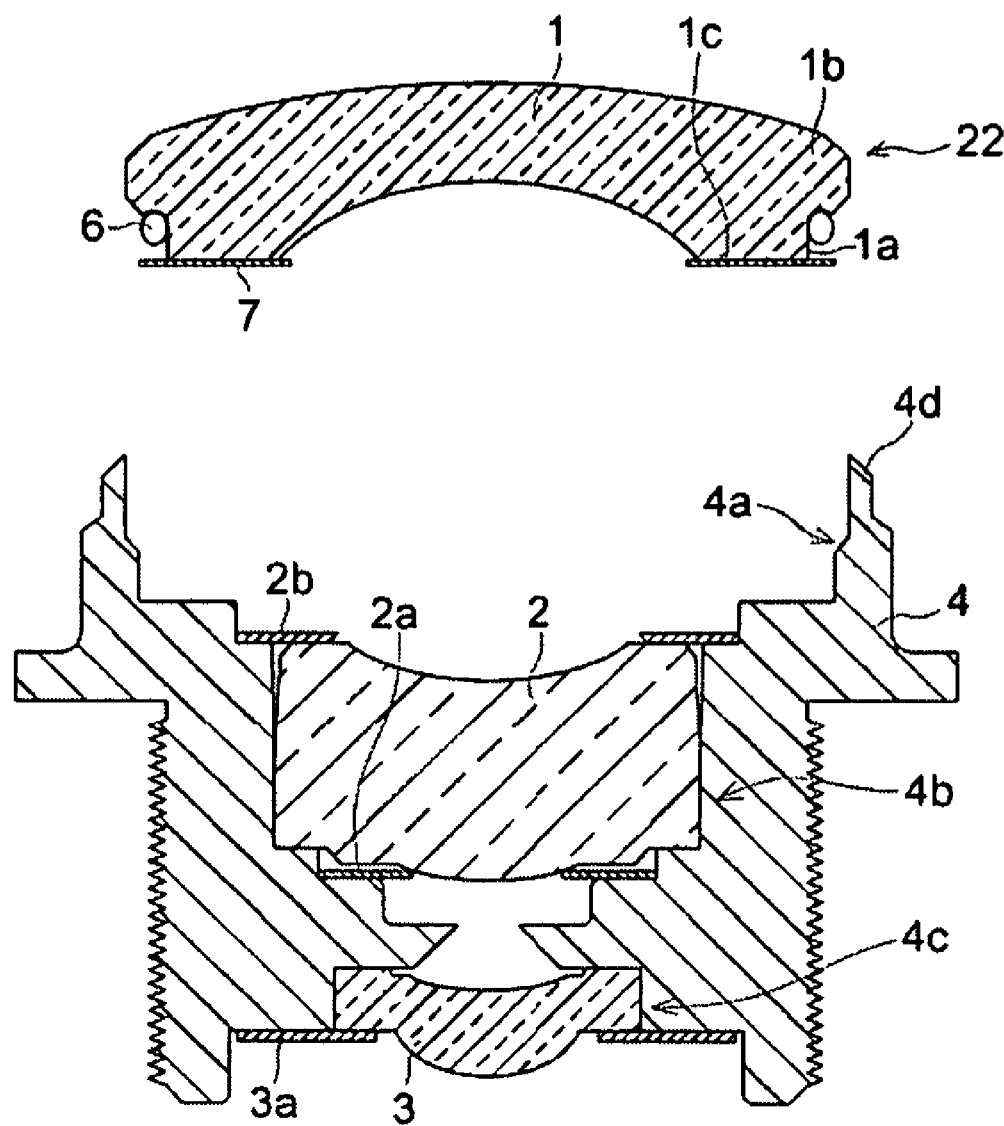
FIG. 2 is a sectional view showing how the first lens is incorporated into a supporting member.

First, as shown in FIG. 2, O-ring 6 is arranged on the sealing surface portion 1a representing a circumference surface of the first lens 1, and light shielding plate 7 is glued on bottom surface 1c of the first lens 1 by the use of adhesive agents. Thus, optical component 22 is formed.

Meanwhile, a diameter of the O-ring 6 is slightly smaller than that of the sealing surface portion 1a. When fitting O-ring 6 to the circumference surface of the first lens 1, the O-ring is stretched in its diameter direction by a jig to be fitted on the first lens, as an additional process. In this process, the O-ring is sometimes fitted in a slightly twisted condition, depending on the state of incorporating.

When employing the O-ring whose outer diameter is smaller than that of the sealing surface portion 1a of the lens, better sealing effect can be obtained.

Since the outer diameter of the light shielding plate 7 is larger than an outer diameter of the first lens 1 on the sealing surface portion 1a, the light shielding plate 7 extends outward from the first lens 1 in its diametral direction in a way to run off the edge of the sealing surface portion 1a.

In the situation shown in FIG. 2, an upward movement of the O-ring arranged on the sealing surface portion 1a of the first lens 1 in the direction of the optical axis of the first lens 1 is prevented by the stepped portion 1b, and a downward movement of the O-ring in the direction of the optical axis of the first lens 1 is prevented by the light shielding plate 7, thus, the movement of the O-ring 6 in the optical axis direction is restricted. In other words, this shielding plate 7 and the stepped portion 1b function as a movement-restricting portion that restricts a movement of the O-ring 6 in the optical axis direction on the first lens 1.

When the movement of the O-ring 6 in the optical axis direction from the first lens 1 is restricted, the O-ring 6 arranged on sealing surface portion 1a of the first lens 1 can be prevented from dropped off the first lens 1.

When optical component 22 is composed of the first lens 1 on which the O-ring 6 and the light shielding plate 7 are arranged, and when the optical component 22 is fitted in upper mounting position 4a of supporting member 4 to be assembled, the O-ring 6 is arranged between an outer circumferential surface of the first lens 1 and an inner circumferential surface of the supporting member 4. Further, the O-ring 6 is compressed in the direction perpendicular to the direction of the optical axis of the first lens 1, whereby, it seals a space between the first lens 1 and the supporting member 4.

Figure 3:
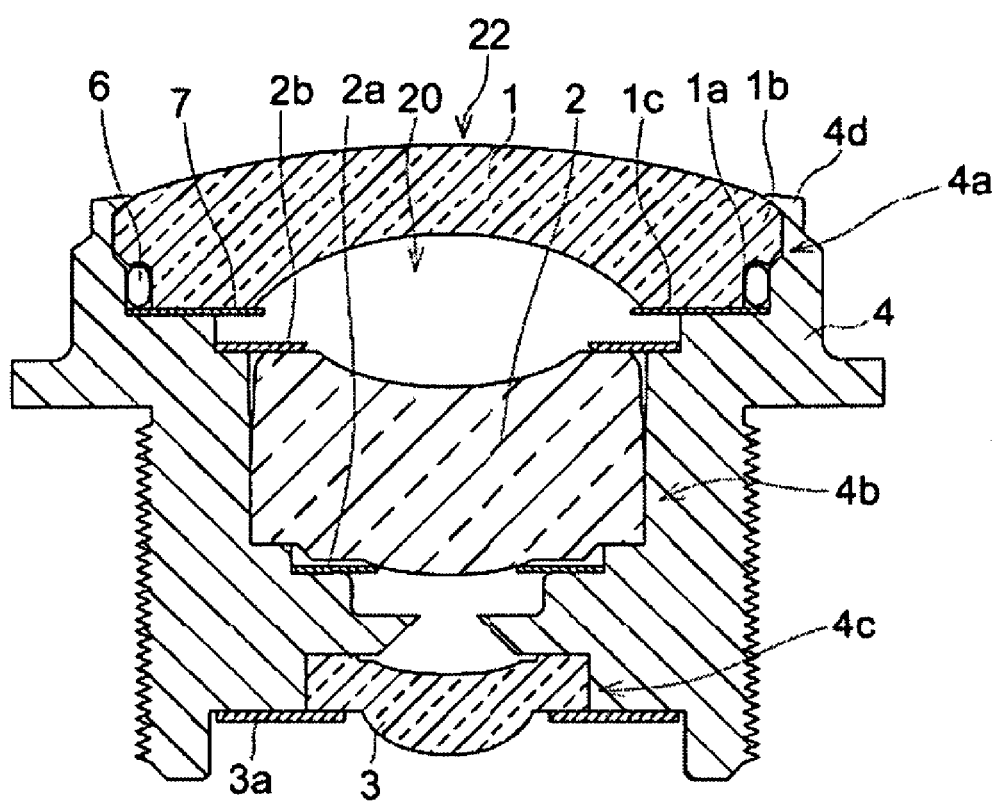
FIG. 3 is a sectional view showing a lens unit of an image pickup unit.

Then, after the first lens 1 is fitted in the upper mounting position 4a, aperture edge portion 4d of the supporting member 4 is deformed by heat or the like to be brought down toward the first lens 1, whereby, the first lens 1 is fixed completely on the supporting member 4, resulting in assembled lens unit 20 shown in FIG. 3.

Owing to the arrangement wherein the aperture edge portion 4d of the supporting member 4 is deformed toward the inner side of an aperture that is a direction toward the first lens 1, a leak of liquid such as rainwater into image pickup unit 100 from the front side of the first lens 1 can easily be prevented.

As stated above, in lens unit 20 representing a part of image pickup unit 100, the first lens 1 is prepared such that the O-ring 6 is arranged on the sealing surface portion 1a of the first lens 1, and that the light shielding plate 7 representing a movement-restricting portion that prevents the O-ring 6 from falling off the first lens 1, is mounted on bottom surface 1c of the first lens 1. When the prepared first lens 1 is incorporated in the supporting member 4, it is possible to incorporate the first lens 1 in the supporting member 4 easily with the O-ring 6 that does not drop off the first lens 1, which means that the first lens 1 can be incorporated properly in better condition.

Further, employing light shielding plate 7 as a movement-restricting portion, does not require to form another movement-restricting portion on the first lens. It reduces the number of parts of the lens unit 20. Further, it makes the shape of the first lens 1 and reduces time required to form the first lens 1.

Then, owing to the first lens 1 incorporated in the supporting member 4, the O-ring 6 arranged between an outer circumferential surface of the first lens 1 and an inner circumferential surface of the supporting member 4, is compressed in the direction perpendicular to the optical axis of the first lens, and it seals a space between the first lens 1 and the supporting member 4. Thereby, it is possible to seal a portion of incorporation between the first lens 1 and the supporting member 4 so that a trouble that the first lens 1 is shifted in the optical axis direction by repulsion of the O-ring 6 may not be caused.

Therefore, the structure for incorporating the optical element relating to the invention, allows the first lens 1 to be incorporated in preferable condition, and allows the first lens 1 to be incorporated into the supporting member 4 in image pickup unit 100 in more preferable condition.

Incidentally, the invention is not limited to the aforesaid embodiment. For example, a movement-restricting portion may also be provided to be formed with the first lens which is an optical element as one body.

Figure 4:
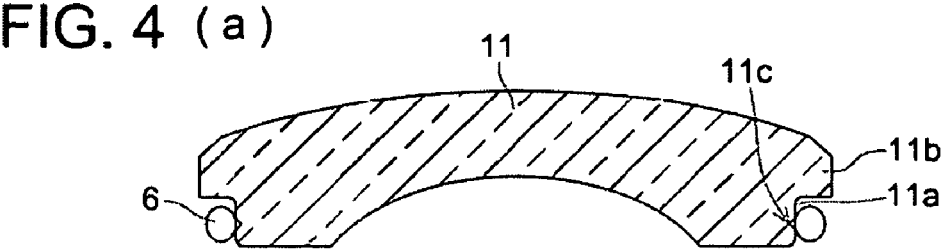
Figure 4:
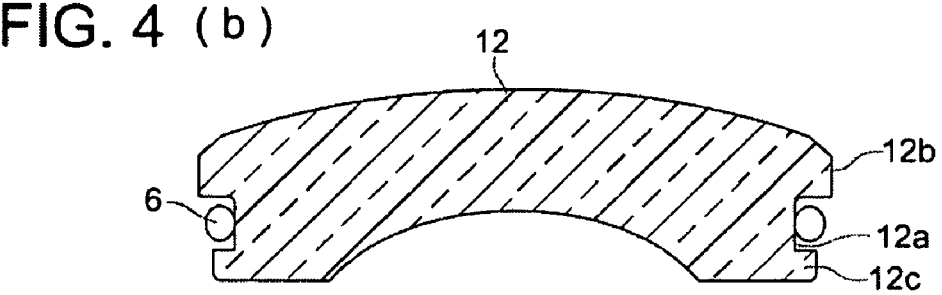
Figure 4:
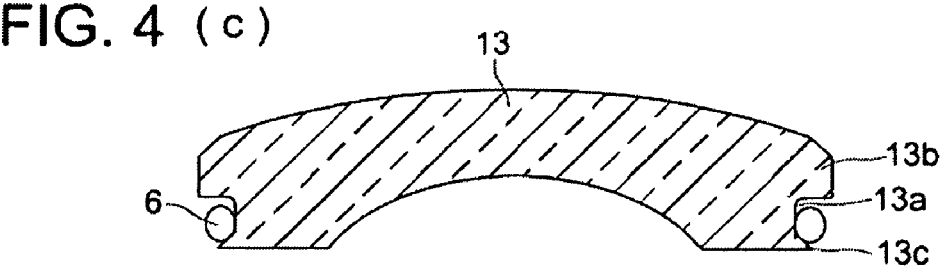
Figure 4:
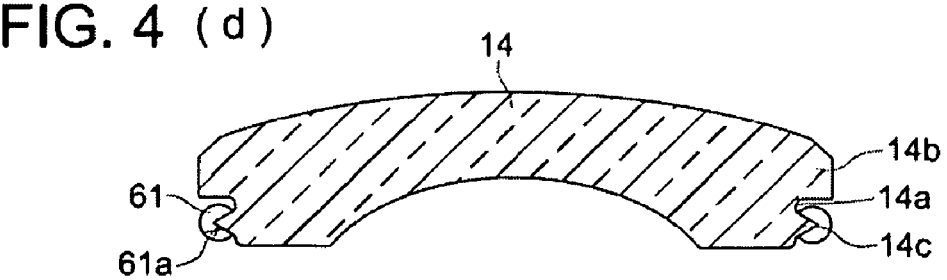
Figure 4:
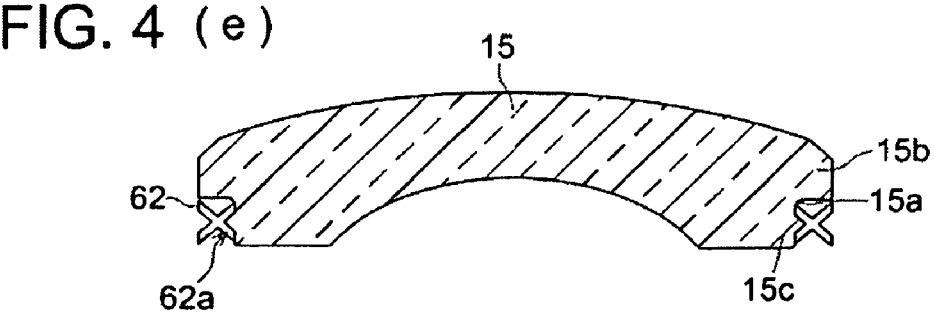
Figure 5:
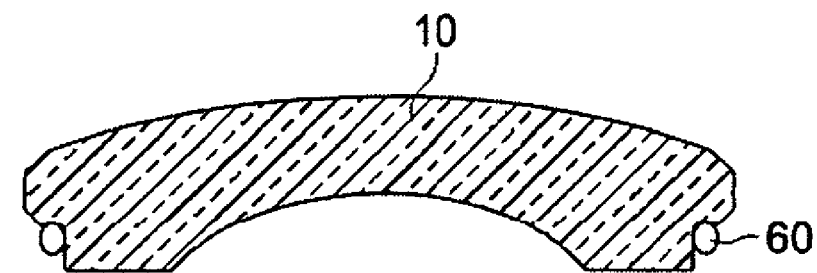
FIG. 5 is a sectional view relating to a conventional lens unit.
Figure 5:
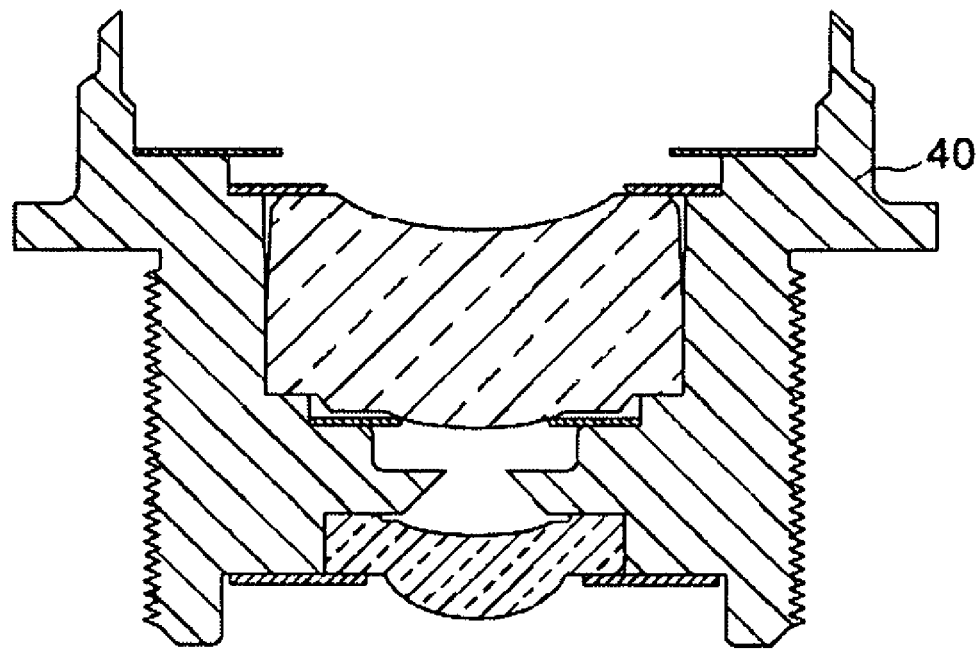

For example, the movement-restricting portion for restricting a movement of the O-ring 6 along the optical axis of the first lens 11 can be provided as shown in FIG. 4(a). The first lens 11 includes stepped portion 11b, and movement-restricting groove 11c representing a movement-restricting portion is formed on sealing surface portion 11a of the first lens 11. When an internal circumference of the O-ring 6 is fitted to the movement-restricting groove 11c, it can avoid the O-ring 6 arranged on the sealing surface portion 11a of the first lens 11 from dropping off the first lens 11.

Further, the movement-restricting portion for restricting a movement of the O-ring 6 along the optical axis of the first lens 12 can be provided as shown in FIG. 4(b). The first lens 12 includes steeped portion 12b, and movement-restricting portion 12c representing a movement-restricting portion is formed at a lower side of the sealing surface portion 12a of the first lens 12, namely is formed on a side opposing to the stepped section 12b across the sealing surface portion 12a. The movement-restricting portion 12c has a cross section in substantially a rectangular shape. Doe to the movement-restricting portion 12c, it can avoid the O-ring 6 arranged on the sealing surface portion 12a of the first lens 12 from dropping off the first lens 12.

Further, the movement-restricting portion for restricting a movement of the O-ring 6 along the optical axis of the first lens 13 can be provided as shown in FIG. 4(c). The first lens 13 includes stepped portion 13b, and movement-restricting portion 13c representing a movement-restricting portion is formed at a lower side of the sealing surface portion 13a of the first lens 13, namely is formed on a side opposing to the stepped section 13b across the sealing surface portion 13a. The movement-restricting portion 13c has a cross section in substantially a triangle shape. Due to the movement-restricting portion 13c, it can avoid the O-ring 6 arranged on the sealing surface portion 13a of the first lens 13 from dropping off the first lens 13.

For incorporating the first lens 1 in the supporting member 4 in the image pickup unit 100 in a preferable condition, the movement-restricting portion (movement-restricting groove 11c, movement-restricting portion 12c, and movement-restricting portion 13c) is preferably formed on at least one of an optical element and a sealing member, for example, on the first lens (11, 12, 13), as stated above.

Alternatively, the movement-restricting portion for restricting a movement of the O-ring 6 along the optical axis of the first lens 14 can be provided as shown in FIG. 4(d). The first lens 14 includes stepped portion 14b, and movement-restricting protrusion 14c is formed on the sealing surface portion 14a of the first lens 14. The movement-restricting protrusion 14c has a cross section in substantially a triangle shape. There is further provided a gasket 61, and fitting groove 61a is provided on the inner circumference surface of the gasket 61. The movement-restricting protrusion 14c and fitting groove 61a represent a movement-restricting portion. By arranging gasket 62 on the sealing surface portion 14a of the first lens 14 such that the movement-restricting protrusion 14c is fitted with the movement-restricting groove 61a, it can avoid the O-ring 6 arranged on the sealing surface portion 14a of the first lens 14 from dropping off the first lens 14.

Further, the movement-restricting portion for restricting a movement of the O-ring 6 along the optical axis of the first lens 15 can be provided as shown in FIG. 4(e). The first lens 15 includes stepped portion 15b, and movement-restricting protrusion 15c is formed on the sealing surface portion 15a of the first lens 15. The movement-restricting protrusion 15c has a cross section in substantially a triangle shape. There is further provided a gasket 62 having a cross section in substantially a cross shape, and fitting groove 62a is provided on the inner circumference surface of the gasket 62. The movement-restricting protrusion 15c and fitting groove 62a represent a movement-restricting portion. By arranging gasket 62 on the sealing surface portion 15a of the first lens 15 such that the movement-restricting protrusion 15c is fitted with the movement-restricting groove 62a, it can avoid the O-ring 6 arranged on the sealing surface portion 15a of the first lens 15 from dropping off the first lens 15.

For incorporating the first lens 1 in the supporting member 4 in the image pickup unit 100 in a preferable condition, the movement-restricting portion (movement-restricting protrusion 14c and fitting groove 61a; movement-restricting portion 15c and fitting groove 62a) is preferably formed on at lease one of an optical element and a sealing member, for example, on the first lens (14, 15) as an optical element and the gasket (61, 62) as a sealing member respectively, as stated above.

In the meantime, in the same way as in FIG. 2, if an O-ring whose outer diameter is slightly smaller than that of sealing surface portion 1a of an ordinary lens is used, an effect for sealing is more enhanced, and easiness of incorporation is improved. For an embodiment of the type shown in FIG. 4(a), it is more desirable if an O-ring whose outer diameter is slightly smaller than a diameter of a movement-restricting groove is used. On the other hand, for embodiments types in FIGS. 4(b)-4(e), a lens itself is equipped with a movement-restricting portion that exceeds an outer diameter of the lens in terms of a size, therefore, the substantial effect can be obtained even when the O-ring whose outer diameter is mostly the same as that of the lens is used.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The aforesaid embodiments has been explained in reference to the example of lens unit 20 that is equipped with three lenses, to which, however, the invention is not limited. For example, the number of lenses and the numbers and arrangements of other members are not limited, and the lens unit can also be in other structures.

Further, though each lens is incorporated in supporting member 4 respectively, it is also possible to mount respective lenses directly to incorporate them in an image pickup unit main body, without using the supporting member 4. In this case, the light shielding plate used in the present embodiment works more effectively, because supporting members that restrict incident light are not provided on respective lenses.

Further, in the aforesaid embodiments, there are shown movement-restricting potions as an movement-restricting portion arranged on at least on of an optical element (first lens) and a sealing member, such as a light-shielding plate 7 attached to the first lens 1, a movement-restricting portion arranged on the optical element (first lens), and a movement-restricting portion arranged on both of the optical element and the sealing member. However, the invention is not limited to the aforesaid example, and a movement-restricting portion can also be provided just on the sealing member.

Further, in the aforesaid embodiment, a stepped portion is provided fully around on the outer circumference of the optical element, and a light shielding plate and a movement-restricting portion are also provided on fully around on the outer circumference. However, the invention is not limited to this, and an outer diameter of these portions (stepped portion, light shielding plate, movement-restricting portion) can be different from the outer diameter of the optical element at least partially along a circumference of the optical element, because the stepped portion just works as a stopper to prevent a sealing member (an O-ring or a gasket) from dropping off. It is also possible to employ the structure wherein there are projections protruding at each of several positions (for example, at 4 positions) along the outer circumference.

Further, for other specific detail structures, they can naturally be modified properly.

The invention claimed is:

1. An optical component comprising:
an optical element;
a sealing member in a ring shape arranged on the optical element;
a stepped portion formed on a front of a circumference surface of the optical element by changing an outer diameter of the optical element, the stepped portion restricting a movement of the sealing member toward a front of the optical element; and
a movement-restricting portion arranged at a rear of the optical element, and restricting a movement of the sealing member toward a rear of the optical element,
wherein the movement-restricting portion is formed on at least the optical element.

2. The optical component of claim 1, wherein the optical element is a negative lens or a meniscus lens with a convex surface facing an object side of the optical element.

3. The optical component of claim 1, wherein the optical element is a lens arranged at a forefront in a wide-angle lens group.

4. The optical component of claim 1, wherein the movement-restricting portion comprises a plate member on the optical element, the plate member being attached to a rear surface of the optical element so as to restrict the movement of the sealing member toward the rear of the optical element, the rear surface being substantially perpendicular to an optical axis of the optical element.

5. The optical component of claim 4, wherein the plate member is an incident-light limiting member.

6. The optical component of claim 1, wherein the movement-restricting portion comprises a portion formed on the optical element as one body with the optical element so as to restrict a movement of the sealing member toward the rear of the optical element.

7. The optical component of claim 1, wherein the movement-restricting portion comprises a second stepped portion on the optical element, the second stepped portion being formed by changing the outer diameter of the optical element.

8. The optical component of claim 7, wherein the second stepped portion is formed on a rear of the circumference surface of the optical element, and
the movement-restricting portion further comprises a fit portion on the sealing member fitted to the second stepped portion.

9. An image pickup unit comprising:
a casing; and
an optical component of claim 1 arranged in the casing.

* * * * *